April 7, 1953   W. M. ALLISON ET AL   2,634,315
ELECTRICAL CONDENSER
Filed Nov. 29, 1951
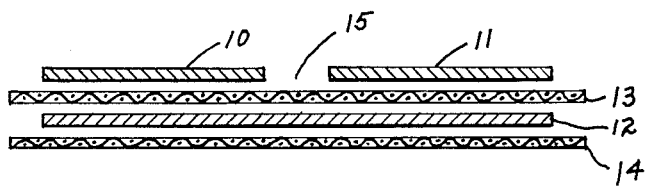
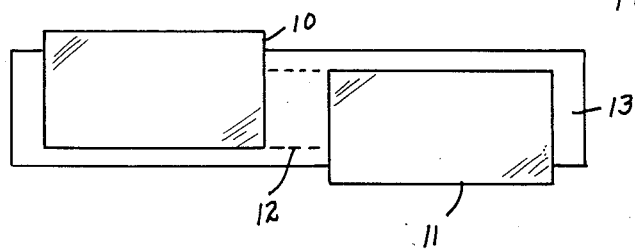
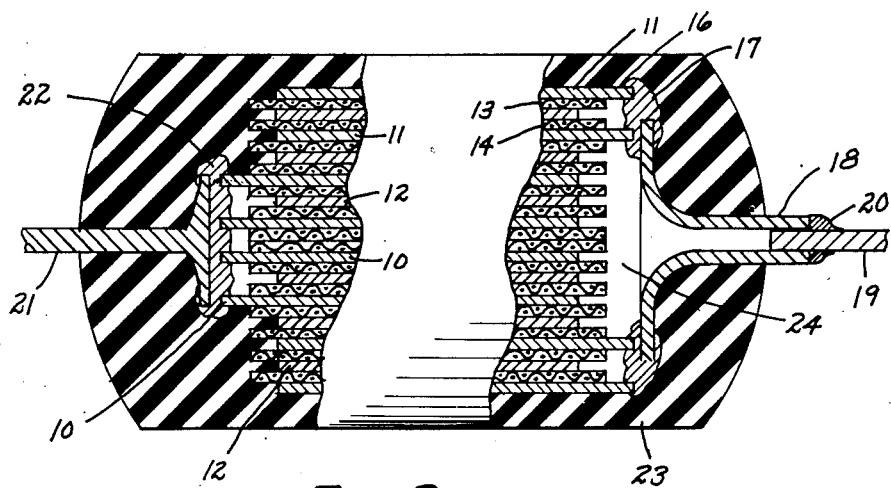
WILLIAM M. ALLISON
PAUL H. NETHERWOOD
INVENTORS
BY Arthur G. Connolly
their attorney Patented Apr. 7, 1953

2,634,315

UNITED STATES PATENT OFFICE 2,634,315

ELECTRICAL CONDENSER

William M. Allison and Paul H. Netherwood, North Adams, Mass., assignors to Sprague Electric Company, North Adams, Mass., a corporation of Massachusetts Application November 29, 1951, Serial No. 258,908

4 Claims. (Cl. 175—41)

1

This invention relates to improved electrical condensers and more particularly refers to small volume, high voltage, series condensers.

Paper tubular condensers are widely used in direct and alternating current circuit applications. As the voltage is increased, it is, of course, necessary to increase the thickness of the dielectric material between the two electrode foils. This can be done by increasing the thickness of each individual sheet of paper, say from 0.0003" to 0.001", there usually being three or, at the most, four of such paper sheets between the foils. It is also possible to increase the number of these thin sheets of paper, but this complicates the winding procedure and equipment. Alternately, two low voltage condensers may be connected in series. This series arrangement can be made in a single winding, but the constructions proposed to date have not led to reduced volume or to higher corona and surge breakdown voltages than those found in the single, high voltage condenser.

For many applications the known types of high voltage condensers have not been particularly satisfactory. For example, a low capacity, high voltage condenser may be placed in parallel with a vibrator in a D. C. source power supply to remove the high frequency, high voltage components from the predominantly low frequency, vibrator output. Such condensers are commonly called buffer condensers, and are subjected to high voltage, high frequency surges which often cause corona formation within the condenser, generally followed by gradual or rapid failure of the condenser. To remove these high frequencies, the condenser also should present a low impedance thereto. For this reason, it is desirable to utilize a condenser having a low inductance.

It is an object of the present invention to overcome the foregoing and related disadvantages of the prior art, high voltage condensers. A further object is to produce new and improved series condensers, useful at high voltage levels. Additional objects will become apparent from the following description of the invention.

These objects are attained in accordance with the present invention by producing a series condenser unit comprising two short and one long convolutely wound electrode foils separated from each other by dielectric spacing material, said long foil being completely enclosed by said dielectric spacing material, one of said short foils overlappng approximately half of the length of said long foil and having one edge extending beyond one side of the winding, and the other

2 of said short foils overlapping approximately the other half of the length of said long foil and having one edge extending beyond the opposite side of the winding. In a more restricted sense, the invention is concerned with a series condenser unit comprising two short, wide foils and one long, narrow foil convolutely wound and separated from each other by dielectric spacing material, said long foil being within the margins of said dielectric spacing material, one of said short foils overlapping slightly less than half of the length of said long foil and being enclosed by said dielectric spacing material except for one edge which extends beyond one side of the winding, the other of said short foils overlapping slightly less than the other half of the long foil and being enclosed by said dielectric spacing material except for one edge which extends beyond the opposite side of the winding, and terminals connected to the extended edges of each of said short foils. In one of its limited embodiments, the invention is concerned with a series condenser unit comprising two short, wide electrode foils and a long narrow, electrode foil convolutely wound and separated from each other by dielectric spacing material, the long foil being completely within the boundaries of said spacing material, one of said short foils overlapping said long foil over slightly less than the inner half of the winding, one edge only of said short foil extending beyond said spacing material, on one side of the winding, the other of said short foils overlapping said long foil over slightly less than the outer half of the winding, one edge only of said short foil extending beyond said spacing material on the opposite side of the winding, a lateral distance of at least ten times the dielectric thickness between overlapping foils, and terminals connected to the extended edges of each of the short foils. The invention is also concerned with a broad-band, high voltage filter assembly, conforming to the above description, except for the introduction of several turns of the long, narrow foil without overlap between the two short foils.

According to the invention, we produce in a single winding two condensers in series, which are adequately insulated from each other, which require small volume per unit capacity and which have a low series inductance. These desirable features are achieved by consecutively winding two short foils which overlap a common long foil, but which are separated from each other by a distance between the more or less adjacent edges sufficient to bring the corona starting voltage to a figure appreciably above the maximum operating voltage. This distance is usually at least 10 times the dielectric thickness between overlapping foils. The total thickness of insulation between the two short foils need be only about 60% of that required in earlier series and individual condensers to provide an adequate margin of safety. Furthermore, there is provided a short path for high frequency currents and thereby the series inductance, in many cases undesirable, is reduced to a very low value.

Our invention is particularly useful in the fabrication of molded resin encased high voltage condensers. The novel structure described herein, when terminals have been attached, has sufficient strength and/or resilience to permit high pressure and temperature molding without undue crushing of the winding. This feature will be described in greater detail below.

The invention may best be described with reference to the appended drawing, wherein Figure 1 is a side view of a series condenser, before convolute winding thereof, Figure 2 is a top view of the same condenser, before convolute winding thereof, and Figure 3 is a cross-section of a completed condenser of the invention.

Referring more specifically to Figures 1 and 2, it will be noted that the short foil 10 overlaps the long, narrow foil 12 for slightly less than half of the length of the latter. One edge of foil 10 extends beyond one side of the dielectric spacers 13 and 14. The other short foil 11 overlaps slightly less than half of long foil 12. One edge of foil 11 extends beyond spacers 13 and 14 on the side opposite to that from which foil 10 extends. The lateral distance 15 between the short foils should be such that the corona starting voltage between the more or less adjacent edges of foils 10 and 11 is appreciably higher than the maximum operating voltage. As a general rule, this distance is between about 10 and 500 times the total dielectric thickness between overlapping foils. It is preferable that the lateral distance be kept at a low value to reduce the series inductance of the condenser unit. Where the inductance need not be minimized, the lateral distance may be increased to a complete turn or more, as hereinafter explained. Long foil 12 lies totally within the boundaries of dielectric spacers 13 and 14.

Referring now to the wound and encased series condenser shown in partial cross-section in Figure 3, short foils 10 and 11 are respectively convolutely wound with totally enclosed long foil 12. The foils are separated by dielectric spacing material 13 and 14. The edges 16 of short foil 11 extend beyond dielectric spacers 13 and 14 and are embedded in low resistance material 17, generally solder. The terminal eyelet 18 is also connected to foil 11 by means of material 17. The extended edges of foil 10 are embedded in low resistance material 22, generally solder, which also connects and secures terminal element 21. The entire assembly, with the exception of the extremities of terminal 21 and eyelet 18, are encased with insulating material 23. This is generally a heat and pressure molded thermosetting resin. It may, however, be cast, sprayed or otherwise applied with thermoplastic or thermosetting resin materials.

If the casing 23 is to be heat and pressure molded, it is generally preferable to conduct the molding prior to impregnation of the spacer with a dielectric oil or wax. We have observed that damp paper spacing material, e. g. containing 8–18% moisture, is very resilient, and, in conjunction with the embedded foil edge construction, permits molding with a minimum of collapse or structural failure. For this reason, we prefer to mold the casing of a paper wound series condenser prior to impregnation thereof with a dielectric oil or wax. Following the molding, the condenser assembly is dried under heat and vacuum, the vapor passing out through eyelet 18. The ports of the winding and freeboard within the casing are then impregnated with an oil or molten wax. As a final step, terminal wire 19 is inserted in eyelet 18 and soldered thereto with solder 20.

The electrode foils may be of aluminum, copper, lead or other low resistance materials. We prefer to use copper and aluminum. As aforesaid, impregnated paper is highly satisfactory as a dielectric spacing material. For low loss applications, polystyrene and other hydrocarbon resin films are suitable. Additional dielectric spacers are regenerated cellulose, glass fibre mats and woven cloths, polysiloxane films, polyamides, etc. While we prefer hydrocarbon oil, wax and grease impregnants for high voltage service, polytetrahaloethylene films and wax impregnants are suitable, and chlorinated naphthalenes, diphenyl, etc., may be used. In some cases it is desirable to impregnate the condenser section before molding with a polymerizable material, such as N-vinyl carbazole; 2,3,4,5,6-pentachlorostyrene; styrene, divinyl benzene with styrene, etc. Polymerization is occasioned in situ by heating. Thereafter, the casing may be applied.

While individual insulating casings have been particularly described, it is possible to insert and enclose the condenser section in a metal container, or open-ended cylinder.

As an example of the present invention, there was constructed a series condenser unit with a total dielectric thickness (twice the thickness of spacer 13 or spacer 14) of 0.00175″. The margin width, or projection of the spacer beyond the side edges of foil 12, was $\tfrac{3}{16}$″ and the lateral distance 15 between short foils was about 0.10″. This unit has a corona starting voltage of about 3300 volts. In comparison, a conventional, non-inductive, extended foil, individual condenser with a dielectric spacing of 0.003″ and a $\tfrac{3}{16}$″ margin had a corona starting voltage of about 2200 volts. The volume of the series condenser unit was appreciably less than that of the individual, high voltage condenser. The impedance of the series condenser unit was very low at the resonant frequency. At high frequencies and/or to make the low impedance spectra broader, the lateral distance 15, shown in Figure 1, may be increased, increasing the series inductance and, to a limited extent, the series resistance along the long foil between the capacitor elements.

For extremely high voltage service, pluralities of the series condensers may be stacked end-to-end and placed in a plastic, glass or ceramic tube, provided with suitable end caps or ferrules. Metal plates may be inserted between the sections to serve as electrical interconnections and to dissipate heat from the foil edges. Special sections, initially wound on a large mandrel, e. g. ¼″ or more, may be slipped over and aligned around a central insulating mandrel, and uniform pressure may be exerted on each section from pressure plates at the ends of the assembly.

The heat and pressure molded thermosetting resin employed for casing 23 of Figure 3 is preferably a phenol-, melamine- or urea-formaldehyde type condensation resin. The use of molded resin casings forms one of the preferred embodiments of the invention, as heretofore it was difficult to provide such casings about high voltage condensers without, for the sake of safety, greatly increasing the winding size.

The two shorter foils are preferably of approximately the same length. It is possible, however, to employ different lengths.

As many widely different embodiments of this invention may be made without departing from the spirit and scope thereof, it is to be understood that the invention is not limited to the specific embodiments hereof except as defined in the appended claims.

This application is a continuation in part of our copending application Serial No. 57,486, filed October 30, 1948, now abandoned.

What is claimed is:

1. A buffer condenser unit comprising two short, wide electrode foils and one long, narrow electrode foil convolutely wound with and separated from each other by dielectric spacing material, the long foil being completely covered by said spacing material, one of said short foils overlapping said long foil over an inner portion of the winding, one edge only of said short foil extending beyond said spacing material, on one side of the winding, the other of said short foils overlapping said long foil over an outer portion of the winding, one edge only of said other short foil extending beyond said spacing material on the opposite side of the winding, said overlapped portions being spaced by about one complete turn of the long foil, and terminals connected to the extended edges of each of the short foils, the terminal connected to the extended end of the short foil which is at the outer end of the winding being a tubular electrically conductive eyelet providing a terminal connection as well as a passageway for drying and impregnating the winding, the winding and at least part of the eyelet being sealed in an impervious molded resin casing.

2. A buffer condenser unit comprising two short, wide electrode foils and one long, narrow electrode foil convolutely wound with and separated from each other by dielectric spacing material, the long foil being completely covered by said spacing material, one of said short foils overlapping said long foil over an inner portion of the winding, one edge only of said short foil extending beyond said spacing material, on one side of the winding, the other of said short foils overlapping said long foil over an outer portion of the winding, one edge only of said other short foil extending beyond said spacing material on the opposite side of the winding, said overlapped portions being spaced by about one complete turn of the long foil, and terminals connected to the extended edges of each of the short foils, the terminal connected to the extended end of the short foil which is at the outer end of the winding being a tubular electrically conductive eyelet providing a terminal connection as well as a passageway for drying and impregnating the winding.

3. A buffer condenser unit comprising two short, wide electrode foils and one long, narrow electrode foil convolutely wound with and separated from each other by dielectric spacing material, the long foil being completely covered by said spacing material, one of said short foils overlapping said long foil over an inner portion of the winding, one edge only of said short foil extending beyond said spacing material, on one side of the winding, the other of said short foils overlapping said long foil over an outer portion of the winding, one edge only of said other short foil extending beyond said spacing material on the opposite side of the winding, said overlapped portions being spaced from each other longitudinally of the long foil, and terminals connected to the extended edges of each of the short foils, the terminal connected to the extended end of the short foil which is at the outer end of the winding being a tubular electrically conductive eyelet providing a terminal connection as well as a passageway for drying and impregnating the winding, the winding and at least part of the eyelet being sealed in an impervious molded resin casing.

4. A buffer condenser unit comprising two short, wide electrode foils and one long, narrow electrode foil convolutely wound with and separated from each other by dielectric spacing material, the long foil being completely covered by said spacing material, one of said short foils overlapping said long foil over an inner portion of the winding, one edge only of said short foil extending beyond said spacing material, on one side of the winding, the other of said short foils overlapping said long foil over an outer portion of the winding, one edge only of said other short foil extending beyond said spacing material on the opposite side of the winding, said overlapped portions being spaced from each other longitudinally of the long foil, and terminals connected to the extended edges of each of the short foils, the terminal connected to the extended end of the short foil which is at the outer end of the winding being a tubular electrically conductive eyelet providing a terminal connection as well as a passageway for drying and impregnating the winding.

WILLIAM M. ALLISON.
PAUL H. NETHERWOOD.

REFERENCES CITED

The following references are of record in the file of this patent:

UNITED STATES PATENTS

| Number | Name | Date |
|---|---|---|
| 1,841,628 | Pickard | Jan. 19, 1932 |
| 2,000,441 | Given | May 7, 1935 |

FOREIGN PATENTS

| Number | Country | Date |
|---|---|---|
| 333,806 | Great Britain | Aug. 21, 1930 |